United States Patent [19]
Körfgen et al.

[11] Patent Number: 5,143,349
[45] Date of Patent: Sep. 1, 1992

[54] VALVE WITH FLOW SHIELD

[75] Inventors: Harald Körfgen, Fröndenberg; Heinz Hirsch, Soest; Vinzenz Grendel, Hemer, all of Fed. Rep. of Germany

[73] Assignee: Friedrich Grohe Armaturenfabrik GmbH & Co., Hemer, Fed. Rep. of Germany

[21] Appl. No.: 580,939

[22] Filed: Sep. 10, 1990

[30] Foreign Application Priority Data

Sep. 9, 1989 [DE] Fed. Rep. of Germany ....... 3930083

[51] Int. Cl.⁵ .............................................. F16K 3/02
[52] U.S. Cl. .................................. 251/314; 251/118; 251/304
[58] Field of Search ............... 251/118, 180, 185, 304, 251/314

[56] References Cited

U.S. PATENT DOCUMENTS 4,501,408  2/1985  Pawelyik et al. .................. 251/314
4,889,157 12/1989  Bergmann ....................... 251/304 X

FOREIGN PATENT DOCUMENTS 2480397  4/1981  France .............................. 251/314

*Primary Examiner*—John C. Fox
*Attorney, Agent, or Firm*—Herbert Dubno

[57] ABSTRACT

A flow-control valve has a housing, a valve plate fixed in the housing and formed relative to a direction of flow through the valve with a flat upstream face and with an outlet port opening at the face, and a control plate fixed in the housing and formed relative to the flow direction with a flat downstream face riding on the valve-plate face and with a throughgoing inlet port opening at the face. This control plate is slidable on the valve plate for alignment of the ports and flow through the valve from the inlet port to the outlet port and for misalignment of the ports for restricted flow from the inlet port to the outlet port. A shield plate is fixed in the housing immediately upstream of the control plate and formed with an aperture aligned in the direction with and of generally the same shape as the port of the valve plate. Thus incoming flow will always be confined to a stream aligned with the outlet port of the valve plate.

10 Claims, 2 Drawing Sheets

VALVE WITH FLOW SHIELD

FIELD OF THE INVENTION

The present invention relates to a flow-control valve. More particularly this invention concerns such a valve having a pair of relatively slidable plates serving to control flow.

BACKGROUND OF THE INVENTION

A standard flow-control valve such as described in German patent document 3,107,431 of W. Orszullok has a normally stationary housing in which is provided a fixed valve plate formed with at least one throughgoing outlet port and a control plate formed with an inlet port. The control plate can be moved into a position with the inlet port at least partially in registration with the outlet port for flow from the cavity into the outlet port.

A common problem with such a system is that flow through the valve in the open condition exerts a torque or lateral force on the control plate and, when pressure is high enough, this force can be sufficient to move the control plate and change the valve's setting. Furthermore laterally deflected flow can strip lubricant off the finely machined meeting faces of the valve and control plates, and particles in the flow can even erode these surfaces.

OBJECTS OF THE INVENTION

It is therefore an object of the present invention to provide an improved flow-control valve.

Another object is the provision of such an improved flow-control valve which overcomes the above-given disadvantages, that is which has valve and control plates that are protected against the flow through them.

SUMMARY OF THE INVENTION

A flow-control valve according to this invention has a housing, a valve plate fixed in the housing and formed relative to a direction of flow through the valve with a flat upstream face and with an outlet port opening at the face, and a control plate fixed in the housing and formed relative to the flow direction with a flat downstream face riding on the valve-plate face and with a throughgoing inlet port opening at the face. This control plate is slidable on the valve plate for alignment of the ports and flow through the valve from the inlet port to the outlet port and for misalignment of the ports for restricted flow from the inlet port to the outlet port. A shield plate is fixed in the housing immediately upstream of the control plate and formed with an aperture aligned in the direction with and of generally the same shape as the port of the valve plate.

Thus according to the invention incoming flow will always be confined to a stream aligned with the outlet port of the valve plate. There will therefore be no significant lateral force component, and flow in the valve will not maladjust it. Furthermore the lack of lateral flow will mean that there will be no sideways flow over the faces of the valve and control plates so that the lubricant on these faces will not be stripped off by the flow.

According to this invention a seal is engaged axially against the shield plate upstream of same. In addition the housing is formed with at least one groove extending in the direction and the shield plate has a tab engaged in the groove. The plates are all centered on an axis and the control plate is rotatable about the axis when slid on the valve plate. The groove extends axially. The housing is formed with a shoulder and the seal presses the shield plate against the shoulder.

Furthermore in accordance with the invention the ports are all confined on the respective plates to a region smaller than a semicircle centered on the axis. Thus when the control plate is rotated through 180° relative to its position with the ports all aligned, flow through the valve will be completely blocked.

The shield plate according to this invention is spaced slightly upstream of the control plate. Furthermore it is made of metal, preferably brass. The seal can be fixed to the shield plate, for instance by an adhesive or by vulcanization.

DESCRIPTION OF THE DRAWING

The above and other objects, features, and advantages will become more readily apparent from the following, reference being made to the accompanying drawing in which.

SPECIFIC DESCRIPTION

Figure 1:
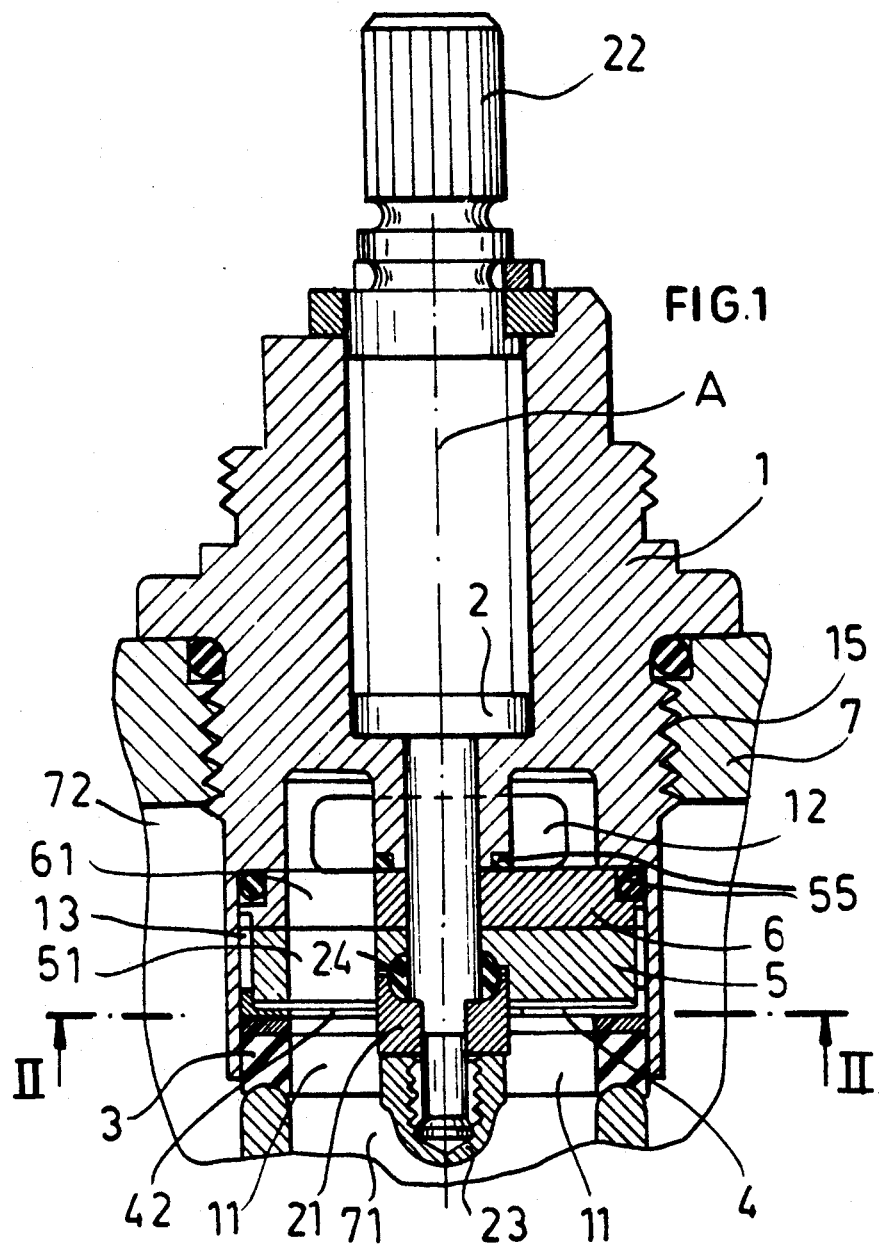
FIG. 1 is an axial section through a valve according to this invention in the full-open position.
Figure 2:
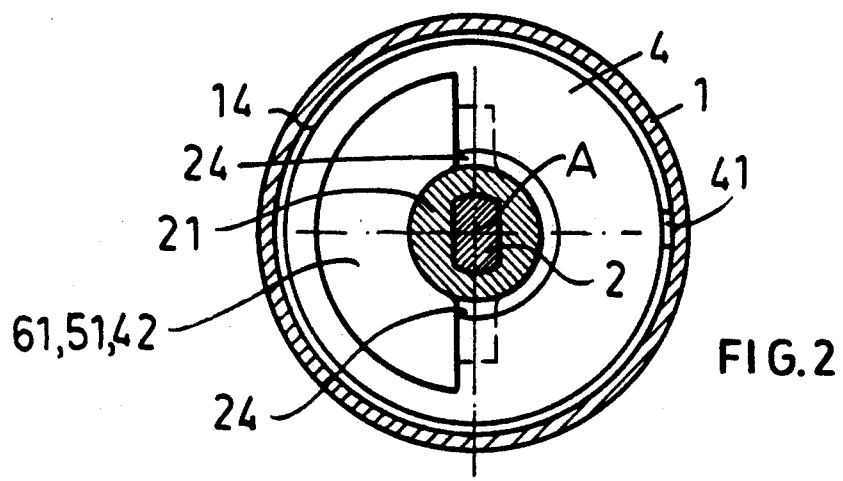
FIG. 2 is a section taken along plane II—II of FIG. 1.

As seen in the drawing a valve according to this invention has a housing 1 secured by screwthreads 15 into a fitting 7, normally a faucet. The fitting 7 has a water inlet tube 71 to which water or another liquid is supplied under pressure and forms around this tube 71 an outlet compartment 72 that is connected to a faucet or the like. The housing 1 and tube 71 are centered on an axis A.

Fixed in the housing 1 is a normally hard-ceramic valve plate 6 that cannot rotate or move at all and that is sealed by an O-ring 55 relative to the housing 7. This plate 6 is formed to one side of the axis A with a semicircular outlet port 61 that communicates with a radially open outlet port 12 opening into the outlet chamber 72.

A stem 22 extending along and rotatable about the axis A in the housing 1 has a lower end carrying a circular control plate 5 formed of a hard ceramic with a semicircular inlet port 51 identical to the port 61. The upper face of the plate 6 and the lower face of the plate 6 are substantially perfectly planar and perpendicular to the axis A. The lower end of the stem carries a nut 23 to which is rotationally fixed an entrainment element 21 that rotationally couples the plate 5 to the stem 22, and an elastic ring 24 is compressed between the element 21 and the plate 5 to press the upper downstream face of the plate 5 against the lower upstream face of the plate 6.

According to this invention a thin brass shield plate 4 is held by an annular seal 3 between the inlet tube 71 and a shoulder 14 of the housing 1, at a slight spacing upstream of the lower upstream face of the plate 5. This plate 4 is formed with small tabs or ears 41 bent axially up and received in grooves 13 formed in the housing 1 so that it cannot rotate therein, and is formed with a semicircular port 42 identical in size and shape to the ports 51 and 61 and permanently aligned with the port 61. This port 42 has a central circular extension 43 that fits closely around the hub of the element 21.

Figure 3:
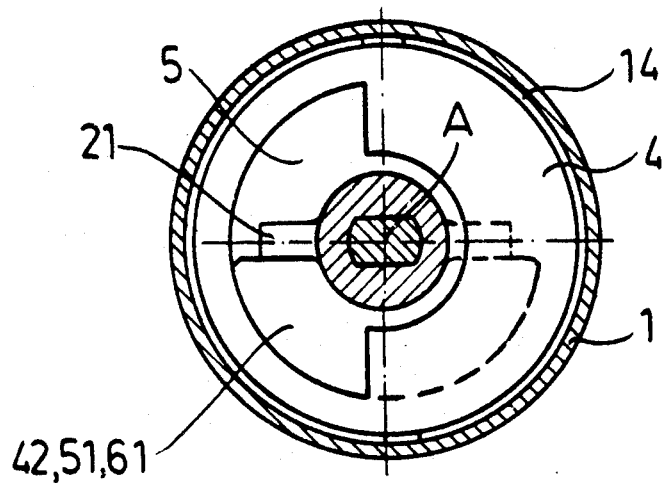
FIG. 3 is a section like FIG. 2 but showing the valve in a partially closed position.
Figure 4:
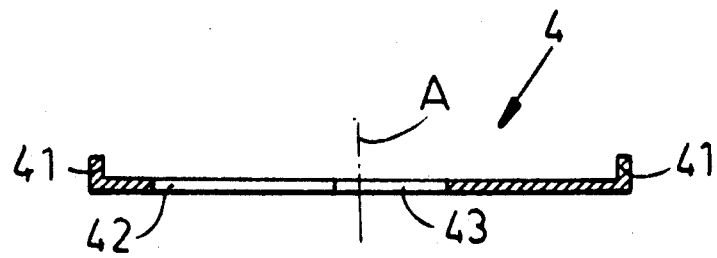
FIG. 4 is a section through the shield plate.
Figure 5:
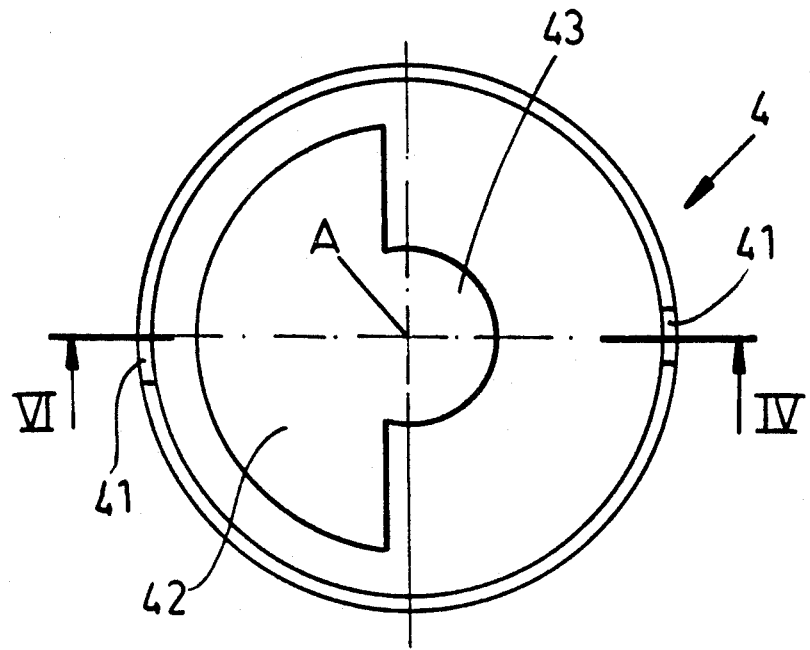
FIG. 5 is a top view of the shield plate, line IV—IV indicating the section plane for FIG. 4.

Thus with this system flow up from the inlet tube 71 first enters a central aperture of the seal 3, which is vulcanized to the lower face of the circular ring 4, and then passes through the shield-late 42. Thereafter the semicircular-section stream defined by the port 42 passes upward and, if the ports 51 and 61 are aligned, through the valve. If as shown in FIG. 3 the ports 51 and 61 are not perfectly aligned, because the control plate 5 has been rotated some 90° from its FIG. 1 position, the stream will have the section of a quarter circle and will not flow over the faces of the plates 5 and 6, instead there will be a dead pocket to each side of the throughgoing passage formed where the ports 51 and 61 overlap, with no significant flow at these locations.

We claim:

1. A flow-control valve comprising:
   a housing;
   a valve plate fixed in the housing and formed relative to a direction of flow through the valve with a flat upstream face and with an outlet port opening at the face;
   a control plate fixed in the housing and formed relative to the flow direction with a flat downstream face riding on the valve-plate face and with a throughgoing inlet port opening at the face, the control plate being slidable on the valve plate for alignment of the ports and flow through the valve from the inlet port to the outlet port and for misalignment of the ports for restricted flow from the inlet port to the outlet port; and
   a shield plate fixed in the housing immediately upstream of the control plate and formed with an aperture aligned in the direction with and of generally the same shape as the port of the valve plate.

2. The flow-control valve defined in claim 1, further comprising
   a seal engaged axially against the shield plate upstream of same.

3. The flow-control valve defined in claim 2 wherein the housing is formed with at least one groove extending in the direction and the shield plate has a tab engaged in the groove.

4. The flow-control valve defined in claim 2 wherein the housing is formed with a shoulder and the seal presses the shield plate against the shoulder.

5. The flow-control valve defined in claim 2 wherein the plates are all centered on an axis and the control plate is rotatable about the axis when slid on the valve plate.

6. The flow-control valve defined in claim 5 wherein the ports are all confined on the respective plates to a region smaller than a semicircle centered on the axis.

7. The flow-control valve defined in claim 2 wherein the shield plate is spaced slightly upstream of the control plate.

8. The flow-control valve defined in claim 2 wherein the shield plate is made of metal.

9. The flow-control valve defined in claim 8 wherein the metal is brass.

10. The flow-control valve defined in claim 2 wherein the seal and the shield plate are fixed together.

* * * * *